United States Patent [19]
Zangenehpour

[11] Patent Number: 5,146,578
[45] Date of Patent: Sep. 8, 1992

[54] METHOD OF VARYING THE AMOUNT OF DATA PREFETCHED TO A CACHE MEMORY IN DEPENDENCE ON THE HISTORY OF DATA REQUESTS

[75] Inventor: Saied Zangenehpour, Stevensville, Mich.

[73] Assignee: Zenith Data Systems Corporation, Buffalo Grove, Ill.

[21] Appl. No.: 685,157

[22] Filed: Apr. 12, 1991

Related U.S. Application Data

[63] Continuation of Ser. No. 345,915, May 1, 1989, abandoned.

[51] Int. Cl.$^5$ .............................................. G06F 12/02
[52] U.S. Cl. ................................. 395/425; 364/243.4; 364/243.41; 364/263.1; 364/DIG. 1
[58] Field of Search ................ 364/DIG. 1, DIG. 2, 364/200 MS File, 900 MS File; 395/425, 800

[56] References Cited

U.S. PATENT DOCUMENTS

| | | | |
|---|---|---|---|
| 3,898,624 | 8/1975 | Tobias | 364/200 |
| 4,157,587 | 6/1979 | Joyce et al. | 364/200 |
| 4,489,378 | 12/1984 | Dixon et al. | 364/200 |
| 4,691,277 | 9/1987 | Kronstadt et al. | 364/200 |
| 4,807,110 | 2/1989 | Pomerene et al. | 364/200 |
| 4,860,192 | 8/1989 | Sachs et al. | 364/200 |
| 4,882,642 | 11/1989 | Taylor et al. | 360/78.11 |
| 4,888,679 | 12/1989 | Fossum et al. | 364/200 |
| 4,918,587 | 4/1990 | Pechter et al. | 364/200 |
| 4,956,803 | 9/1990 | Taylor et al. | 364/900 |

*Primary Examiner*—Michael R. Fleming
*Assistant Examiner*—Gopal C. Ray
*Attorney, Agent, or Firm*—Flynn, Thiel, Boutell & Tanis

[57] ABSTRACT

A method of dynamically prefetching data for a cache memory is controlled by the past history of data requests. If the previous fetch and current fetch request are not sequential, no data is prefetched. If the previous fetch and current fetch request are sequential and less than all of the current fetch request is already in the cache, two blocks of data sequentially beyond the current fetch request are prefetched. If the previous two blocks fetched and current fetch request are sequential and less than all of the current fetch request is already in the cache, four blocks of data sequentially beyond the current fetch request are prefetched. If the previous three blocks fetched and the current fetch request are sequential and less than all of the current fetch request is already in the cache, eight blocks of data sequentially beyond the current fetch request are preferred. The prefetch algorithm is limited at eight blocks. Each additional sequential request less than all of which is already in the cache will cause eight blocks to be prefetched.

14 Claims, 2 Drawing Sheets

METHOD OF VARYING THE AMOUNT OF DATA PREFETCHED TO A CACHE MEMORY IN DEPENDENCE ON THE HISTORY OF DATA REQUESTS

This application is a continuation of U.S. Ser. No. 07/345,915, filed May 1, 1989, now abandoned.

FIELD OF THE INVENTION

The present invention relates to methods for increasing the efficiency of cache memories and more specifically to methods for improving the efficiency of prefetching data for a cache memory.

CROSS REFERENCE TO RELATED APPLICATIONS

This application is related to but in no way dependent on co-pending U.S. applications: "Two Stage Cache Memory System and Method", Ser. No. 07/657,969, filed Feb. 20, 1991, which is a continuation of Ser. No. 292,189, filed Dec. 30, 1988, abandoned on Mar. 22, 1991 as part of a file wrapper continuation of Ser. No. 292,579, filed Dec. 30, 1988, of common ownership and inventorship herewith.

BACKGROUND OF THE INVENTION

Information or data can be stored relatively inexpensively in various magnetic or optical mass-storage devices such as tapes, disks or drums. These devices are slow, non-volatile, and only provide for access to large blocks of data. Silicon-based random access memory (RAM) is significantly faster, provides for random byte-by-byte access to data, but is volatile and more expensive. The difference in speed is often several orders of magnitude.

It is common practice in the computer industry to mass-store data in magnetic or optical mass-storage devices, transfer the data to RAM for use or modification, and then transfer the data back to the mass-storage devices. The use of RAM in this way permits the high speed processing of the data in a computer system. However, due to the slow speed of the mass-storage devices, the processing operation performed by the computer system is significantly delayed when more data is needed from a mass-storage device. Several methods are conventionally used to minimize such delays.

One common approach is the use of a cache memory. A cache memory is usually RAM and is normally embodied as part of the mass-storage controller. When the CPU requests data from a mass-storage device, the requested data is fetched from the mass-storage device along with a prefetch of more data than requested. Both the requested and prefetched data are loaded into the cache memory, the requested data for current use and the prefetched data in anticipation of subsequent use. Each subsequent request for data is first checked against the cache memory before it is fetched from a mass-storage device. Since data stored in the cache memory can be supplied to the computer RAM much faster than from a mass-storage device, processing speed is substantially enhanced especially if the prefetched data is anticipated correctly.

The most common method of prefetching is sequential prefetching. Sequential prefetching assumes that data requests will be made in order of logical sector address. Therefore, each request is accompanied by a prefetch at the next higher logical sector address. However, since prefetching requires the removal of one block of data from the cache memory for each block of data prefetched, it is sometimes best not to prefetch at all, thereby retaining more of the previously stored data in the cache memory. Since such previously stored data may be requested again, it is desirable to retain it in the cache as long as possible.

If a program requests information sequentially, sequential prefetching advantageously results in the requested data being in the cache memory before it is requested in most cases. However, as mentioned above, if prefetching causes the removal of data that will be used again in a short time, prefetching is a disadvantage. Programs generally perform some combination of requesting information sequentially and requesting information in some other pattern. It is, therefore, advantageous to prefetch sequentially when a process requests data sequentially and not prefetch sequentially when the processes does not request data sequentially.

When there is basic information about the source of the request or the source of the data, an educated guess can be made as to a good prefetching strategy. One such variable prefetching algorithm is disclosed in U.S. Pat. No. 3,898,624—Tobias, "Data Processing System with Variable Prefetch and Replacement Algorithms". When all data comes from a common mass-storage device such as a disk drive and no prior information is known about requests, past history is the only clue available as to future requests. The present invention uses past history to determine whether or not to prefetch and the amount of data to prefetch.

OBJECTS OF THE INVENTION

It is an object of this invention to provide a more efficient method for replacing data in a cache memory.

It is another object of this invention to provide a technique for sequentially prefetching data only when it is advantageous to do so.

It is a further object of this invention to provide a technique for sequentially prefetching data in proportion to the probability of sequential data being requested.

It is a further object of this invention to provide a technique for prefetching data according to the past history of data requests.

It is a further object of this invention to provide a technique for prefetching large amounts of data in response to a history of large requests and prefetching small amounts of data in response to a history of small request.

BRIEF DESCRIPTION OF THE DRAWINGS

Preferred embodiments demonstrating the various objectives and features of the invention will now be described in conjunction with the following drawings in which:

FIG. 3 is a diagram representing a register used to record the state of previous fetches in the preferred embodiment of the invention.

DETAILED DESCRIPTION OF THE PREFERRED EMBODIMENTS

In the present invention, the amount and location of data prefetched from mass-storage devices to a cache memory is determined by the past history of requests for data fetches. If the previous data fetch and the current fetch request are not for data with sequential addresses, no data is prefetched from mass-storage. If the previous fetch and current fetch request are for data with sequential addresses and the currently requested data is not already in the cache memory, two blocks of data at the next sequential logical sector address beyond the current fetch request are prefetched. In other words, the quantity of data fetched includes a fetch portion which contains currently requested data at sequential addresses, and a prefetch portion which does not contain currently requested data but instead contains the two additional blocks of data at sequential addresses. If the previous two fetches and the current fetch request are for data with sequential addresses and the currently requested data is not already in the cache memory, four blocks of data at the next sequential logical sector address beyond the currently requested data are prefetched. In other words, the quantity of data fetched includes a fetch portion which contains currently requested data at sequential addresses, and a prefetch portion which does not contain currently requested data but instead contains the four additional blocks of data at sequential addresses. If the previous three fetches and the current fetch request are for data with sequential addresses and the currently requested data is not already in the cache memory, eight blocks of data at the next sequential logical sector address beyond the current fetch request are prefetched. In other words, the quantity of data fetched includes a fetch portion which contains currently requested data at sequential addresses, and a prefetch portion which does not contain currently requested data but instead contains the eight additional blocks of data at sequential addresses. The prefetch algorithm is limited at eight blocks. Each additional sequential request that is not already in the cache will cause eight blocks to be prefetched. These numbers are exemplary and the invention is not limited to these numbers or units of measure.

Figure 1:
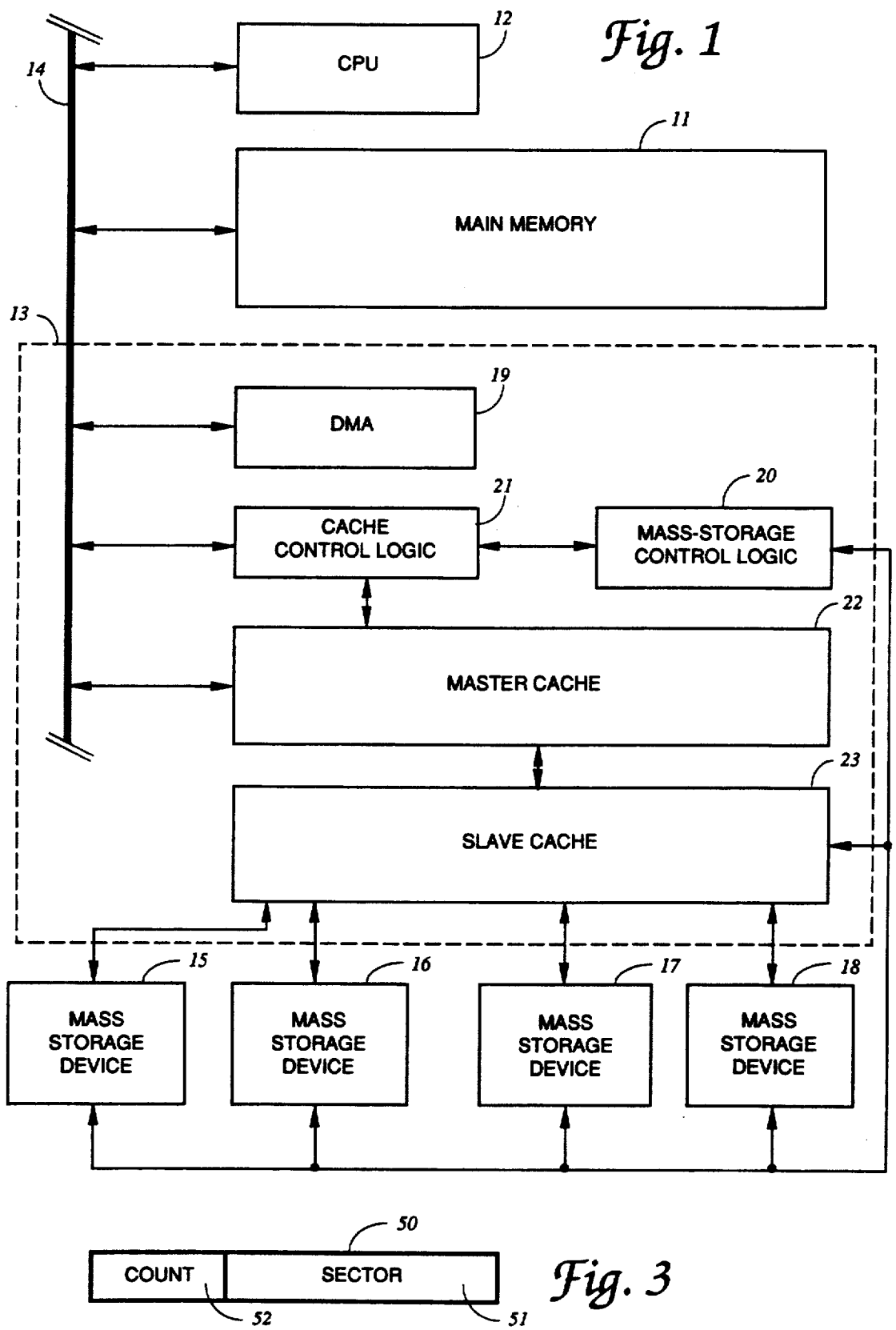
FIG. 1 is a block diagram of a computer system illustrating a cache memory system according to the invention.

Referring to FIG. 1, a computer system embodying the invention comprises a main memory 11, a CPU 12, and a mass-storage controller 13 all interconnected by a bus 14. A plurality of mass-storage devices 15, 16, 17, and 18 are also interconnected with mass-storage controller 13. Mass-storage devices 15-18 may include magnetic tapes and disks and optical disks. Bus 14 includes a plurality of signal lines that can be divided into three groups: data lines, address lines, and control lines. Mass-storage controller 13 includes a DMA 19, connected to bus 14, a mass-storage control logic unit 20, a cache control logic unit 21, a master cache memory 22, and a slave cache memory 23. Normally, in a non-cache system mass-storage control logic unit 20 is connected directly to the control and address lines of bus 14. However, in the present application, cache control logic unit 21 is placed between bus 14 and mass-storage control logic 20. Cache control logic 21 is transparent. That is, bus 14 and mass-storage control logic 20 functionally operate as though they were directly connected together. Master cache 22 is directly connected to the data lines of bus 14 and also interconnected with slave cache 23. Slave cache 23 is also interconnected with mass-storage devices 15-18. Cache control logic 21 and mass-storage control logic 20 control the flow of data between master cache 22, slave cache 23, and mass-storage devices 15-18.

A request to move data from mass-storage devices 15-18 to main memory 11 is initiated by CPU 12. Thus, the CPU can be viewed as a requesting circuit. The request is sent by CPU 12, or by DMA 19 at the request of CPU 12, over bus 14 to mass-storage control logic 20. However, cache memory control logic 21 interrupts the request and searches master cache memory 22 for the address of the requested data. If the requested data is in master cache memory 22, the requested data is transferred over bus 14 to main memory 11. If the data is not in master cache memory 22, the request is passed along to mass-storage control logic 20. Mass-storage control logic 20 determines which mass-storage device 15-18 contains the requested data and where on that device the data resides. The data is then sent from the selected mass-storage device to slave cache memory 23. Slave cache memory 23 is dual-ported SRAM (static random access memory). Acting as a speed adjustment buffer, slave cache 23 collects the requested data from the selected mass-storage device at the slower speed of the mass-storage device and sends the data out in the order received to master cache memory 22 but at a much higher speed. The requested data is then sent from master cache memory 22 to main memory 11 via bus 14.

Figure 2:
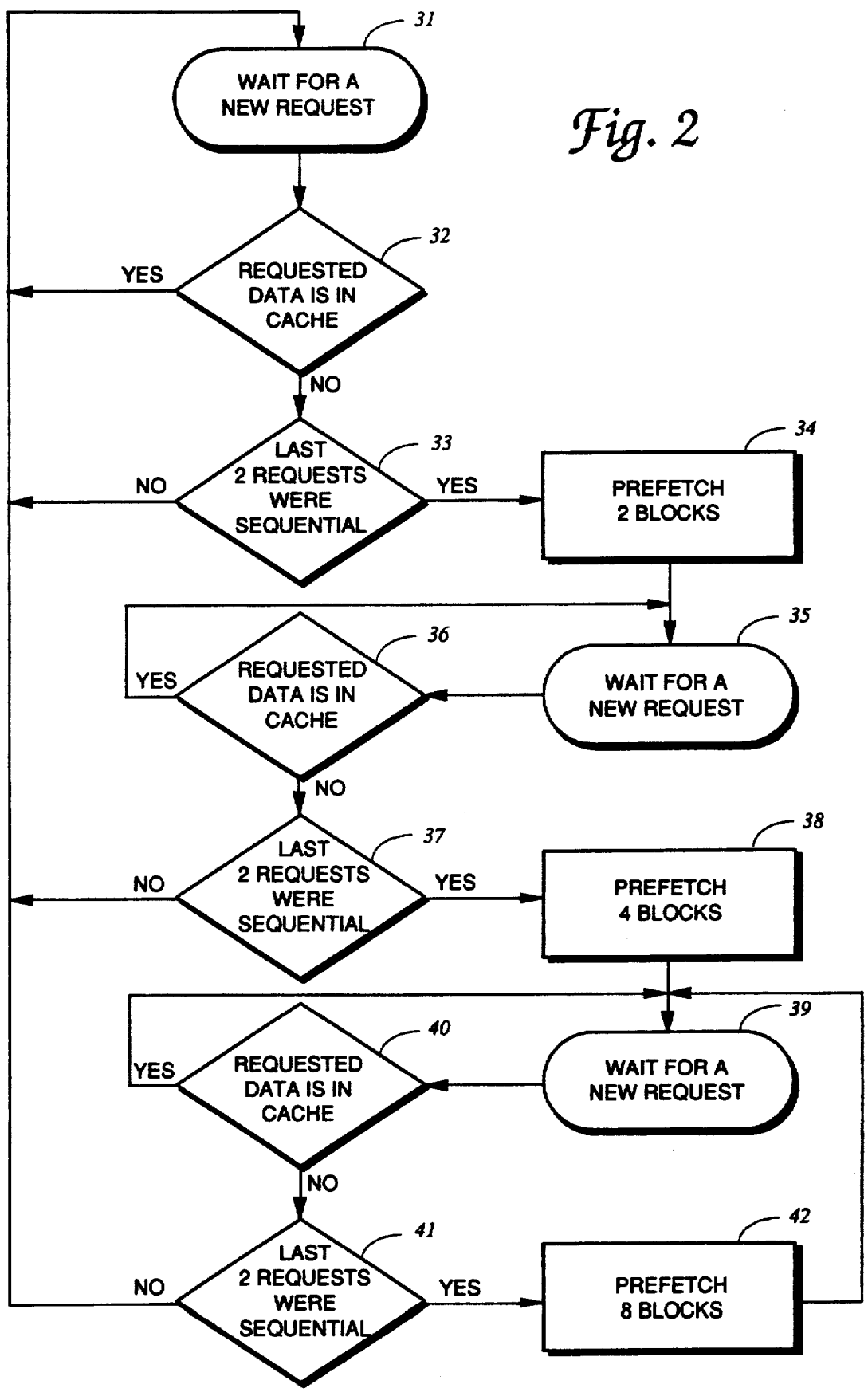
FIG. 2 is a flow chart showing the method by which prefetching is varied in the preferred embodiment of the invention.

Cache control logic 21 includes a microprocessor for executing the algorithm shown in FIG. 2 to determine the level of prefetching. Gate array logic or other hardwired devices could be used rather than a microprocessor with no change in the algorithm. The algorithm starts in a state 31 where cache control logic 21 constantly checks for ne fetch requests. Cache control logic 21 only moves to state 32 when a new request is received. In state 32 the request is checked against the cache memory. If the requested data is in master cache 22, cache control logic 21 returns to state 31. If not cache control logic 21 moves on to state 33. In state 33, the previous fetch (which is stored in a register to be described later) and the current fetch request as received from CPU 12 or DMA 19 over bus 14 are checked to see if they are sequential. If the addresses of the current fetch request and the previous fetch are not sequential cache control logic 21 loops back to state 31. If the previous fetch and current fetch request are for data with sequential addresses, two sequential blocks of data beyond the current fetch request are prefetched in state 34.

From state 34 cache control logic 21 moves to state 35 where cache control logic 21 again checks for a new fetch request and moves on to state 36 only when a new request is received. In state 36 cache control logic 21 checks master cache 22 for the requested data. If the current fetch request is found in master cache 22, cache control logic 21 returns to state 35 and no data is prefetched. If the requested data is not found in master cache 22, cache control logic 21 moves on to state 37. In state 37, cache control logic 21 again looks at the previous fetch and the current fetch request to determine if they are sequential. Notice that if the previous fetch and the current fetch request are determined to be sequential, the previous two fetches and the current fetch request must also be sequential, because the most recent fetch and second most recent fetch must have been sequential to arrive at state 37. If the previous fetch and current fetch request are not for data with sequential addresses cache control logic 21 returns to state 31. If the current fetch request and the previous fetch are sequential, cache control logic 21 moves to state 38 where four sequential blocks of data beyond the current fetch request are prefetched.

After state 38 cache control logic 21 moves to state 39 where cache control logic 21 again checks for a new fetch request and moves on to state 40 only when a new request is received. If the requested data is found in master cache 22, as checked in state 40, cache control logic 21 returns to state 39. If the requested data is not found in master cache 22, cache control logic 21 moves on to state 41. In state 41 the previous fetch and current fetch request are again checked to see if they are sequential. If they are sequential, meaning that the last four fetch requests sequential cache control logic 21 moves on to state 42 where eight sequential blocks of data beyond the current fetch request are prefetched.

After state 42, cache control logic 21 loops back to state 39 and continues to loop between states 39, 40, 41, and 42 until a non-sequential fetch request is received in which case cache control logic 21 returns to state 31.

Mass-storage devices 15-18 are typically disk drives. Data on a disk is stored in sectors. In the preferred embodiment, there are 512 bytes per sector. Data in master cache 22 is stored in blocks. There are 4096 bytes per block or 8 sectors per block. Because cache control logic 21 is transparent to CPU 12, CPU 12 operates as if it is requesting data directly from mass-storage devices 15-18. Therefore, CPU 12 requests data in sectors not blocks. When cache control logic 21 receives a request for data that is not contained in master cache 22 (a cache miss), cache control logic 21 always requests enough sequential sectors of data from mass storage devices 15-18 to fill a whole block. Therefore, there are always 8 sequential sectors in each cache block.

If, for example, CPU 12 requests the data from sector 24 of one of the mass-storage devices 15-18, and this data is not in master cache 22, cache control logic 21 will load sectors 24 - 32 of the selected mass-storage device in a block of master cache 22. If the CPU requests data sequentially but in small amounts, as described above, data is only prefetched occasionally because later requests will normally be in the same block. In this case, state 32 will be true and state 34 will not be reached. However, processes that request data in larger amounts, like eight sectors or more will cause state 32 to be false most of the time and prefetch data more often and in larger amounts.

A process requesting sequential data from a mass-storage device starting at sector 1012 in requests of 4 sectors each will start by requesting sectors 1012-1015. If these sectors are not in master cache 22, cache control logic 21 will load a block comprising sectors 1012-1019 from the mass-storage into master cache 22. With the second sequential request, i.e. sectors 1016-1019, cache control logic 21 will move from state 31 to state 32, finding the data in master cache 22, cache control logic 21 will return to state 31. The third sequential request, i.e. sectors 1020-1023 will not be found in master cache 22 as checked in state 32 and cache control logic 21 will move through state 33 because the last two requests were sequential to state 34 where two blocks, sectors 1020-1035 will be prefetched. With the next sequential request, sectors 1024-1027, cache control logic 21 moves through state 35 to state 36 where the request is found in master cache 22. Cache control logic 21 will then return to state 35. The next two, four sector requests will result in no prefetching because cache control logic 21 will return to state 35 after the requested data is found in master cache 22 in state 36.

Now take the case of requesting 24 sectors at a time. The first request for sectors 1012-1035 will cause those sectors, three blocks, if not already in master cache 22, to be loaded into master cache 22. Cache control logic 21 will move from state 31 to state 32. Assuming the requested data is not in cache memory, cache control logic 21 goes first to state 33. Also assuming the request for sectors 1012-1035 and the previous request are not sequential, cache control logic 21 will return to state 31. The next sequential request for sectors 1036-1059 will not be found in master cache 22. The requested three blocks will, therefore, be loaded into master cache 22 and cache control logic 21 will move through state 32. Because the last two requests were sequential, cache control logic will move through state 33 to state 34 where 2 more blocks, sectors 1060-1075 will be loaded into master cache 22. Cache control logic 21 will move on to state 35. The third request, sectors 1060-1083 will cause cache control logic 21 to move on to state 36. The requested data will only be partially in cache so cache control logic 21 will move through state 36, load sectors 1076-1083 into master cache 22, move through state 37 because the last two request were sequential, and move through state 38 where 4 blocks, sectors 1084-1115 will be prefetched. Cache control logic 21 will move through state 39 with the fourth request, sectors 1084-1107, and at state 40 the data will be completely in master cache 22. State 40 will be true and cache control logic 21 will return to state 39. The fifth sequential request, sectors 1108-1131 will cause cache control logic 21 to move through state 39, through state 40 where less than all of the requested data will be found in master cache 21, through state 41 because the last two requests were sequential, and to state 42 where sectors 1132-1196 will be prefetched. Cache control logic will return to state 39 and wait for a new request. Hence, larger requests will result in larger prefetches and smaller requests will result in smaller prefetches.

Referring to FIG. 3, the physical implementation of the algorithm shown in FIG. 2 uses a register 50 located in cache control logic 21. One such register is provided for each logical mass-storage device 15-18. Register 50 contains a sector field 51 and a count field 52. Sector field 51 contains the highest logical sector address of the most recent fetch request. The logical sector in sector field 51 is compared with the current fetch request to determine if these two addresses are sequential. Sequential addresses result in a Yes response to states 33, 37, and 41. Non-sequential addresses result in a No response in states 33, 37, and 41 and a return to state 31. In particular, count field 52 is originally set to zero. Each time there is a difference of 1 between the current fetch request and sector field 51 in states 33, 37, 41, the value in count field 52 is incremented by one. An increment in count field 52 from 0 to 1 indicates a transition from state 33 to state 34. An increment from 1 to 2 indicates a transition from state 37 to state 38. An increment from 2 to 3 indicates a transition from state 41 to state 42. Each time there is not a difference of one between the current fetch request and sector field 51, count field 52 is reset to zero indicating a return to state 31.

Using this information the prefetch algorithm of FIG. 2 can be reduced to a few simple steps:
1) If less than all of the current fetch request is present in the cache, if the count field is less than three, and if there is a difference of one between the first sector of current request and the valve in the sector field, then increment the count field by one and prefetch 2 count (2 raised to the power of "count") data blocks.
2) If there is not a difference of one between the sector field and the current fetch request, reset the count field to zero.
3) Put the highest sector of the current fetch request in the sector field.

The forgoing can be expressed in psudocode as:

```
IF LessThanAllFoundInCache(CurrentRequest) & (Count < 3)
THEN IF Sector + 1 = CurrentRequest
    THEN Count:=Count + 1;
         Prefetch 2 count Blocks
    ELSE Count:=0;
    ENDIF
ENDIF
Sector:=LastSector(CurrentRequest)
```

DESCRIPTION OF SOME ALTERNATE EMBODIMENTS

Cache memories are used in several application in the computer art. The improvements described here are equally applicable to any form of cache memory. Any time there is a significant difference in speed between two forms of stored data, cache memories and the present invention can be beneficial. The invention is described in terms of a two stage cache memory for a mass-storage controller because that is the most effective way of implementing the invention. However, the principal invention is also effective if used with a single cache memory or other forms of multiple cache memories.

The invention is particularly useful in a networked work station with a remote file server. In this case the mass-storage devices are kept at a remote location and data is supplied through a network. Better cache replacements result in more cache hits. More cache hits result in less traffic on the network. Less traffic o the network results in better performance for all network users.

Although described above in terms of a few alternative embodiments, the present invention is set forth with particularity in the appended claims. Such modifications and alterations as would be apparent to one of ordinary skill in the art and familiar with the teachings of this application shall be deemed to fall within the spirit and scope of the invention.

I claim:

1. A method of prefetching data for a cache memory from a mass-storage device in response to a fetch request generated by a requesting circuit, comprising the steps of:
    checking whether a previous fetch and a current fetch request are for data with sequential addresses, and prefetching data with sequential addresses beyond the current fetch request if the previous fetch and the current fetch request are for data with sequential addresses; and
    keeping track of the number of successive fetches with sequential addresses, and progressively increasing the amount of said data with sequential addresses prefetched as the number of successive fetches with sequential addresses progressively increases.

2. The method according to claim 1, further comprising the steps of writing an address of the previous fetch in a sector field of a register;
    comparing the sector field to an address of the current fetch request; and
    determining from the comparison of the sector field with the address of the current fetch request whether the previous fetch and the current fetch request are for data with sequential addresses.

3. The method according to claim 2, further comprising the steps of:
    incrementing a count field in the register in response to each successive request at sequential addresses;
    setting the count field to zero in response to a request at a non-sequential address; and
    carrying out said progressively increasing step using the value from the count field as said number of successive fetches.

4. The method according to claim 1, including the step of:
    treating a current fetch request for data that is already contained in the cache memory as a request which does not result in a prefetch of sequential data beyond the address of the currently requested data.

5. A method of prefetching blocks of data from a first memory to a second memory in response to a fetch request generated by a requesting circuit, comprising the steps of:
    checking whether a previous fetch and a current fetch request are for data with sequential addresses, and keeping track of the number of successive fetches with sequential addresses;
    prefetching the next two sequential blocks beyond an address of the current fetch request if the previous fetch and the current fetch request are for data with sequential addresses;
    prefetching the next four sequential blocks beyond the current fetch request if the previous two fetches and the current fetch request are for data with sequential addresses; and
    prefetching the next eight sequential blocks beyond the current fetch request if the previous three fetches and the current fetch request are for data with sequential addresses.

6. A method of prefetching data for storage in a cache memory from a mass-storage device in response to a fetch request generated by a requesting circuit, comprising the steps of:
    checking whether a previous fetch and a current fetch request are for data with sequential addresses, and maintaining a record representative of the number of successive fetches with sequential addresses;
    prefetching the next two sequential blocks beyond an address of the current fetch request if the previous fetch and the current fetch request are for data with sequential addresses and the cache memory lacks a portion of the currently requested data;
    prefetching the next four sequential blocks beyond the current fetch request if the previous two fetches and the current fetch request are for data with sequential addresses and the cache memory lacks a portion of the currently requested data; and
    prefetching the next eight sequential blocks beyond the current fetch request if the previous three fetches and the current fetch request are for data with sequential addresses and the cache memory lacks a portion of the currently requested data.

7. The method according to claim 6 further comprising the steps of:
providing a register containing a sector field;
writing the address of the last sector of the previous fetch in eh sector field;
comparing the sector field to an address of the current fetch request; and
determining from the comparison whether the previous fetch and the current fetch request are for data with sequential addresses.

8. The method according to claim 7 further comprising the steps of:
providing a count field in the register;
incrementing the count field in response to each sequential request;
setting the count field to zero with each non-sequential request; and
determining the number of sequential requests from the count field.

9. A method of transferring data from a first memory to a second memory in response to successive requests which are issued by a requesting circuit and which each specify a segment of data having sequential addresses, comprising the steps of:
detecting each said fetch request;
fetching from said first memory to said second memory in response to detection of each of a first and a second of said requests a respective quantity of data which includes a fetch portion at sequential addresses and a prefetch portion at sequential addresses, said prefetch portion following and being contiguous to said fetch portion; and
dynamically varying the size of said prefetch portion, wherein the respective prefetch portions, which are fetched in response to each of said first and second requests, are of different size, said dynamically varying step including the steps of checking whether the quantity of data to be fetched in response to a current execution of said fetching step is contiguous to the quantity of data fetched in response to the immediately preceding execution of said fetching step, keeping track of the number of successive executions of said fetching step, including the current execution thereof, in which said quantities of data fetched are all contiguous, and selecting the size of said prefetch portion in dependence on the number of successive executions of said fetching step, including the current execution thereof, in which said quantities of data fetched are all contiguous.

10. The method according to claim 9, including immediately following said detecting step the step of determining whether all data in the specified segment is already in said second memory, and thereafter carrying out said fetching step only if said determining step results in a determination that a portion of the specified segment is missing from said second memory, the segments specified by said first and second requests each including a portion missing from said second memory.

11. The method according to claim 9, wherein said selecting step is carried out by progressively increasing the size of said prefetch portion in response to a progressive increase in said number of successive fetches of said quantities of data which are contiguous.

12. The method according to claim 11, wherein said selecting step is carried out by doubling the size of said prefetch portion each time said number of successive fetches increases.

13. The method according to claim 12, wherein said fetching step includes the steps of using an integer multiple of a predetermined data block size for each said fetch portion and each said prefetch portion, and progressively increasing said prefetch portion rom two blocks to four blocks to eight blocks in successive said fetching steps in response to successive increases in said number of successive fetching steps fetching said quantities of data which are contiguous.

14. The method according to claim 9, including the steps of using as said second memory a cache memory, and using as said first memory a mass storage device which is slower than said cache memory.

* * * * *